United States Patent [19]

Eliason

[11] Patent Number: 5,233,493
[45] Date of Patent: Aug. 3, 1993

[54] NOTCHED ARCUATE MAGNET FOR ROTARY ACTUATOR

[75] Inventor: Eric N. Eliason, St. Louis Park, Minn.

[73] Assignee: Seagate Technology, Inc., Scotts Valley, Calif.

[21] Appl. No.: 685,189

[22] Filed: Apr. 15, 1991

[51] Int. Cl.[5] .............................................. G11B 5/55
[52] U.S. Cl. .................................... 360/106; 360/107
[58] Field of Search ............................... 360/104–107, 360/109

[56] References Cited

U.S. PATENT DOCUMENTS

| | | | |
|---|---|---|---|
| 4,896,232 | 1/1990 | Sugawara | 360/99.08 |
| 5,005,095 | 4/1991 | Wagner | 360/107 |
| 5,050,026 | 9/1991 | Goss | 360/106 |
| 5,072,321 | 12/1991 | Kanai et al. | 360/99.04 |

Primary Examiner—Stuart S. Levy
Assistant Examiner—Jefferson Evans
Attorney, Agent, or Firm—Haugen and Nikolai

[57] ABSTRACT

A rotary actuator for a magnetic disk drive includes an abutting pair of stationary arcuate permanent magnets and a thin, arcuate voice coil formed of a single winding of aluminum wire. The magnets and the voice coil are curved about a pivot axis of a rotating shaft supporting a movable head arm assembly of the rotary actuator. The voice coil, integral with the head arm assembly, pivots the head arm assembly responsive to electrical current introduced into the coil, particularly along two parallel active segments parallel to the pivot axis. The magnets are formed by a forging process which results in radial magnetic flux paths in their magnetic fields. Notches are formed in each magnet, symmetrically about longitudinal and transverse planes that bisect the magnet and spanning the radial thickness of the magnet. The notches counter-balance a gradient in the density of magnetic material from the peripheral regions to the center of each magnet, for greater consistency in motive force from interacting magnetic fields of the permanent magnet and voice coil, over the entire arcuate path traversed by the voice coil.

11 Claims, 5 Drawing Sheets

NOTCHED ARCUATE MAGNET FOR ROTARY ACTUATOR

BACKGROUND OF THE INVENTION

The present invention relates to magnetic disk drive data storage devices, and more particularly to the magnets used in rotary actuators employed in such devices to selectively position magnetic transducing heads relative to rotating magnetic disks.

Magnetic disk drives generally include either linear actuators or rotary actuators to position magnetic reading and recording heads with respect to rotatable magnetic disks. Such heads typically are moved approximately radially of the disks to seek and follow a selected one of multiple tracks of data stored on the disk.

Rotary actuators typically include a shaft mounted rotatably on a deck or stationary housing portion of the drive, along with a plurality of stacked transducer support arms connected to the shaft for movement with (or with respect to) the shaft. A magnetic transducing head is mounted to the end of each support arm remote from the shaft, and thus travels in an arcuate path as the arms pivot. The means for controllably pivoting the head arm assembly usually is an electric motor including a voice coil and permanent magnets. Typically the voice coil is a flat loop perpendicular to the shaft pivot axis, connected to the shaft. Permanent magnets, integral with disk drive housing, are positioned in spaced apart relation to the voice coil on opposite sides of the coil. When electrical current is carried through the voice coil, a magnetic field is generated which interacts with the magnetic field of the permanent magnet to provide the force which moves the voice coil and thus rotates the shaft.

There are certain disadvantages inherent in this arrangement. Only the radially outward portion of this voice coil has a desirably long moment arm, i.e. the distance from the pivot axis. The radially inward portions of the coil have shorter effective moment arms, and thus provide correspondingly reduced rotational force on the shaft and head arm assembly. Accordingly, U.S. patent application Ser. No. 451,200 filed Dec. 15, 1989 and assigned to the assignee of the present application, features a thin, arcuate voice coil curved about the pivot axis of the rotary actuator. The coil, formed of a single winding of aluminum wire, is integral with the head arm assembly. A pair of permanent magnets and the voice coil are curved about the pivot axis and spaced apart radially from one another to define a narrow, arcuate air gap. The radial dimension of the voice coil is its thickness, which is quite small compared to its length and width, accordingly, substantially all of the coil has the same moment arm or lever arm about the pivot axis, for more consistent and reliable performance of the rotary actuator.

The performance of the rotary actuator is a function of the permanent magnet or magnets as well as the voice coil. The typical magnet arrangement involves two magnets side by side. The magnets are uniform in their height, in the direction parallel to the pivot axis, and in their thickness in the radial direction. The width of the magnets is arcuate, such that the magnets form abutting segments of a circular cylinder.

For maximum efficiency in reciprocating the head arm assembly, the magnetic flux paths should be radial. Radial flux paths are perpendicular to the arcuate path of the coil, so that the applied force, perpendicular to magnetic flux, is tangential at each radius, i.e. arcuate over multiple radii. The magnets conventionally utilized in actuators are formed by scintering, however, which results in linear and parallel flux paths. Parallel flux paths deviate from the desired radial flux paths with increasing severity as the arcuate width of the magnet increases and the radial distance from the pivot axis decreases. Accordingly, the scintered magnet gives rise to strict physical design limitations, and an uneven distribution of force along the arcuate path of the voice coil.

Recently it has been found that arcuate magnets, when forged rather than scintered, can be formed with the desired radial magnetic flux paths. Forging, however, tends to increase the density of magnetic material in the center of each magnet relative to the peripheral regions. The result is an uneven distribution of magnetic force, in spite of the desired radial flux path orientation.

Therefore, it is an object of the present invention to provide a rotary actuator in which the permanent magnet arrangement provides an even distribution of forces along substantially all of an arcuate path of travel of a rotary actuator voice coil.

Another object of the invention is to provide a permanent magnet for a rotary actuator, shaped in a manner to compensate for gradients in the density of magnetic material from the edges of the magnet to its center.

Yet another object is to provide a rotary actuator for magnetic disk drives, in which the interaction of respective magnetic fields of a permanent magnet arrangement and an arcuate voice coil is characterized by a substantially uniform distribution force along the entire range of arcuate travel for the voice coil.

SUMMARY OF THE INVENTION

To achieve these and other objects, there is provided a rotary actuator for variably and controllably positioning a magnetic transducing head relative to a magnetic disk mounted for rotation on a stationary disk drive frame. The actuator includes a head arm assembly having at least one transducer support arm and a data transducing head mounted to the support arm. The head arm assembly is mounted to a stationary disk drive frame for pivoting relative to the frame about a longitudinal pivot axis. Such pivoting carries the data transducing head in an arcuate path relative to a data recording surface of the magnetic disk. An electrically conductive voice coil is curved about the pivot axis and fixed to the head arm assembly for arcuate travel as the assembly pivots. The voice coil includes at least one longitudinally extended active region for pivoting the head arm assembly when the voice coil conducts electrical current. A permanent magnet means is fixed to the disk drive frame. The magnet means has mutually perpendicular dimensions including a height in the longitudinal direction, an arcuate width curved about the pivot axis from a first edge to a second edge of the magnet means, and a substantially uniform thickness radially of the pivot axis. The magnet means is radially spaced apart from the voice coil for arcuate travel of the active region along the magnet means to pivot the head arm assembly. The magnet means includes a non-magnetic region spanning the entire thickness of the magnet means, substantially centered along the path of travel of the active region, and symmetrical about a longitudinal plane that bisects the magnet means.

Preferably the non-magnetic region also is symmetrical about a transverse plane that bisects the magnet means. In one arrangement, the magnet means includes two arcuate magnets side-by-side. The voice coil is generally rectangular, with two longitudinally extended and radially spaced apart segments that provide two active regions, one associated with each of the magnets. These active regions move in concert, each along its associated one of the arcuate magnets.

In each of the magnets, the non-magnetic region is provided by removing material to form opposed notches extending longitudinally toward the center of the magnet from opposite ends of the magnet. Each of the notches includes a transverse surface centered along the arcuate width of the magnet and having a width at least equal to the width of its associated voice coil active segment. The notch further includes a pair of substantially planar inclined surfaces, one on each side of the transverse surface. Accordingly, as the coil active region travels arcuately along the magnet from one of the edges toward the center, the height of the magnet decreases linearly until the active region is centered on the magnet. The decreasing height of the magnet counter-balances the increase in density of magnetic material at the magnet center, tending to balance the force distribution over the arcuate width of the magnet.

Alternate versions of the permanent magnets feature differently shaped notches. For example, a curved notch can be provided at each end of the magnet, defined by an arc about a transverse axis remote from the magnet and within the longitudinal bisecting plane. The slope of the notch thus gradually decreases, from the edges of the magnet to its center. Conversely, each notch can include a longitudinally inward transverse surface in combination with two opposed curved surfaces, the slopes of which increase from the magnet edges toward the center. This notch configuration is appropriate where the rate of increase in density, as well as density itself, rises in directions toward the center of the magnet.

Thus, in accordance with the present invention, arcuate permanent magnets with radially directed flux paths can be fashioned to provide a substantially even distribution of force along the entire arcuate width of the magnet, to achieve a more uniform response to the amount of current carried in the voice coil, improving accuracy in positioning the magnetic transducing heads.

IN THE DRAWINGS

For a further understanding of the above and further features and advantages, reference is made to the following detailed description and the drawings, in which.

DETAILED DESCRIPTION OF THE PREFERRED EMBODIMENTS

Figure 1:
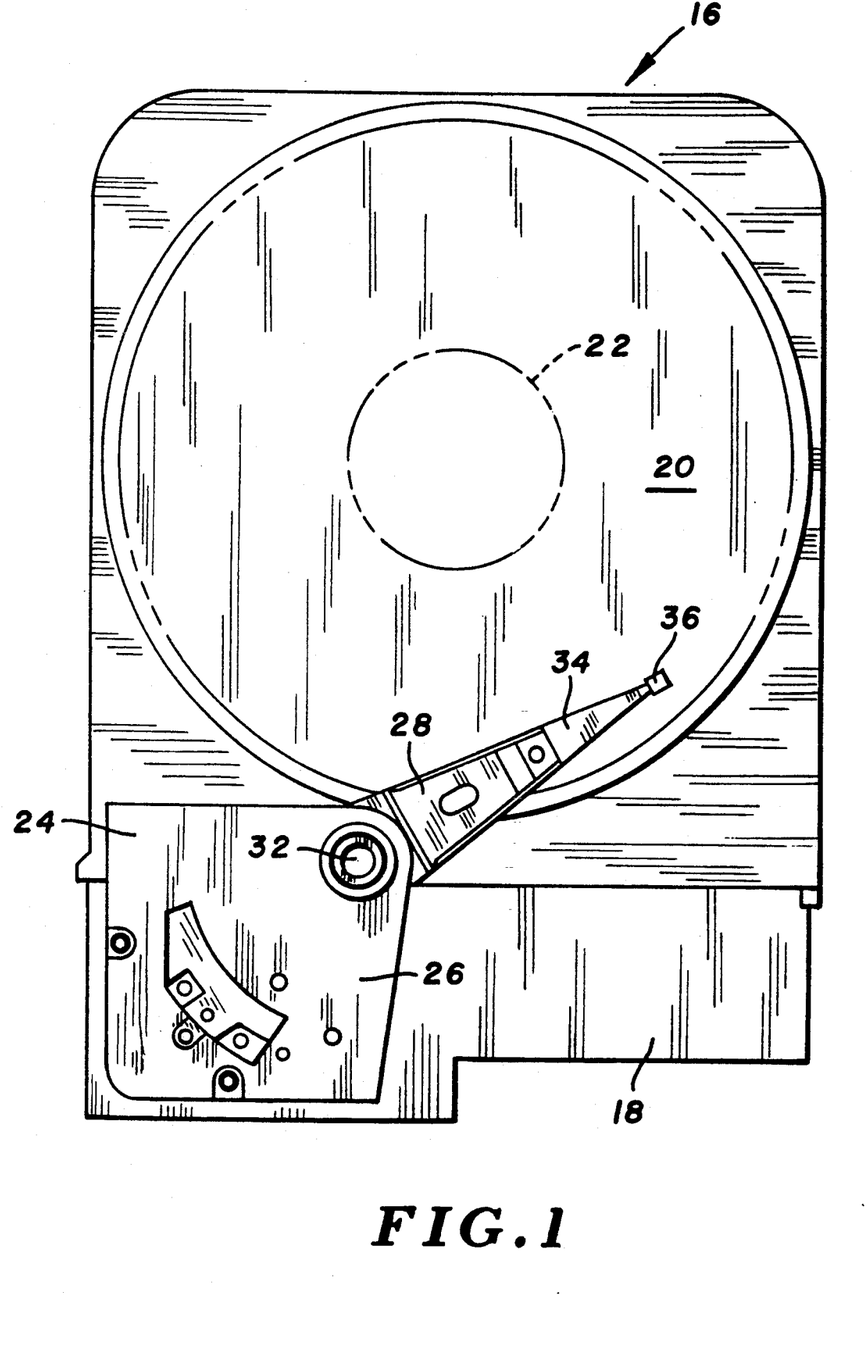
FIG. 1 is a top plan view of a magnetic disk drive including a rotary actuator constructed in accordance with the present invention.

Turning now to the drawings, there is shown in FIG. 1 a magnetic disk drive 16 including a deck 18 which is part of a stationary framework or housing for the disk drive. A stack of magnetic data storage disks, the top one being shown at 20, is rotatably mounted relative to the deck through a spindle 22. Also mounted on deck 18 is a rotary actuator 24, including a base support 26 which is fixed to the deck, and a head arm assembly 28 which is movable relative to the support. More particularly, head arm assembly 28 can be pivoted with respect to the support and deck about a longitudinal (i.e. vertical) axis 30 of an actuator shaft 32. The head arm assembly includes a stack of multiple transducer support arms, the top one being shown at 34. A magnetic transducing head 36 is supported at the free end of arm 34, remote from the actuator shaft, whereby transducing head 36 transverses an arcuate path as the head arm assembly pivots.

Figure 2:
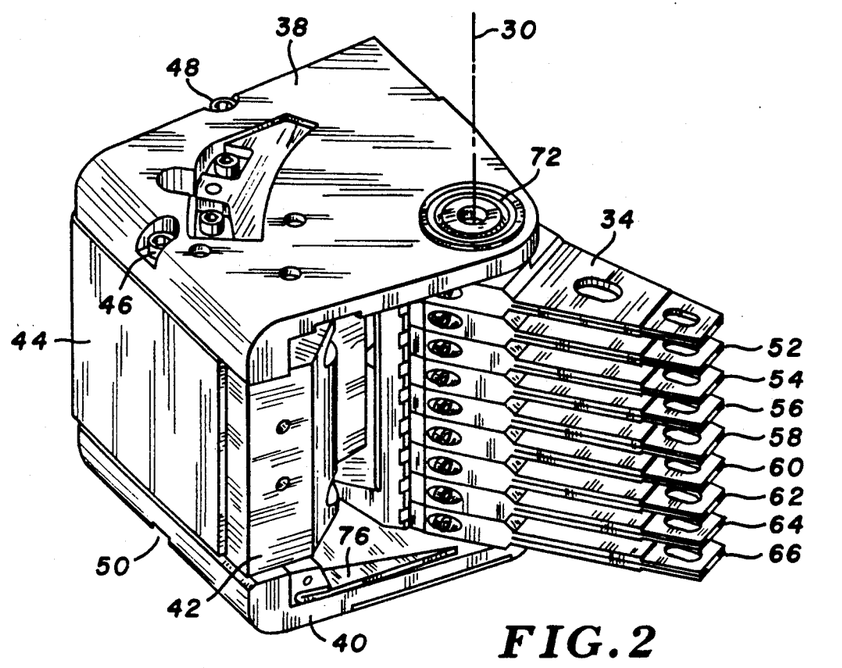
FIG. 2 is a perspective view of the actuator assembly.

FIG. 2 shows actuator assembly 24 removed from the disk drive. The stationary support of the actuator assembly includes a pair of generally transverse or horizontal bearing plates constructed of aluminum, in particular an upper bearing plate 38, and a lower bearing plate 40 secured to deck 18. An aluminum pole piece support bracket 42 is secured to bearing plates 38 and 40. The bearing plates also are secured to a pole piece 44, e.g. by fasteners at 46, 48 and 50. The pole piece preferably is constructed of a low carbon steel, and acts as a spacer to maintain the separation between the bearing plates. Head arm assembly 28 includes a plurality of transducer support arms 52-66 along with top arm 34, all integral with actuator shaft 32 and thus rotating in concert as the shaft pivots.

A pole piece support bracket 68 (FIG. 4) cooperates with bracket 42 in determining the location of a pole piece 70 situated between brackets. An upper bearing 72 and a similar lower bearing are supported by bearing plates 38 and 40, respectively, and support opposite ends of actuator pivot shaft 32 to enable shaft rotation. The vertical or longitudinal separation of the bearings is predetermined with respect to the actuator shaft length such that one of the bearing plates is at least slightly elastically deformed when shaft 32 is supported between them. Two biasing springs, one of which is shown at 76, provide the main axial bearing preload. Thus, the bearings provide a restoring force which secures the actuator shaft position.

Figure 3:
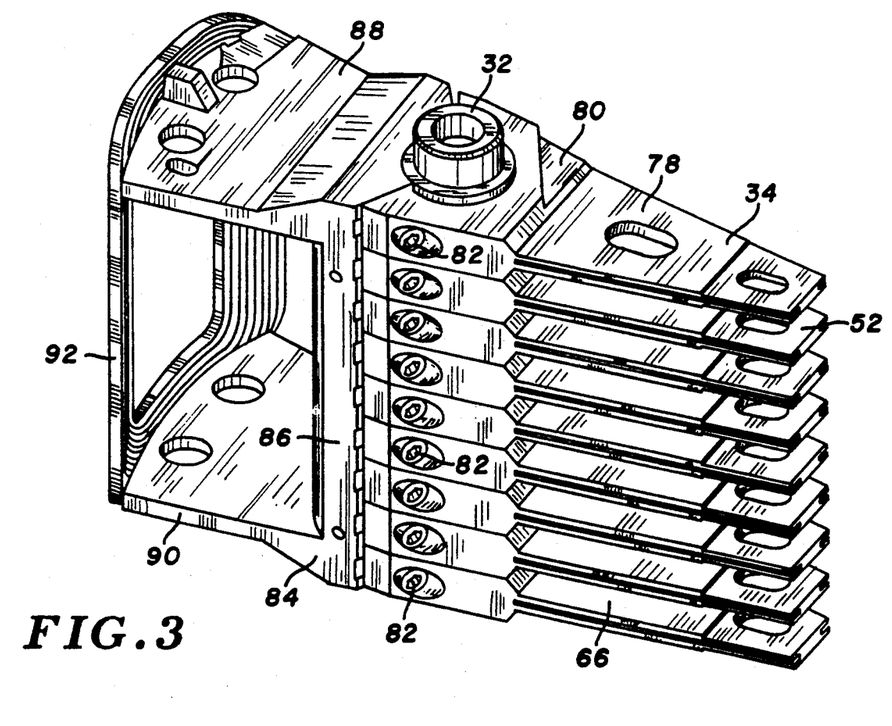
FIG. 3 is a perspective view of a head arm assembly of the actuator.

The head arm assembly is illustrated in FIG. 3. Transducer support arms 34 and 52-66 are substantially identical. Arm 34, for example, includes a relatively thin tapered portion 78 extended radially of a relatively thick base 80. Fasteners 82, and similar fasteners on the other side and thus not visible in the figure, secure base 80 and bases of arms 52-66 to a frame 84 that supports the voice coil. With actuator pivot shaft 32 positioned between the bases and an upright support portion 86 of the frame, fasteners 82 secure the arms and the frame integrally to the actuator pivot shaft. Upper and lower flanges 88 and 9 of frame 84 extend radially away from shaft 32, in a direction opposite to that of arm extension, thus to counter-balance the transducer support arms. A voice coil 92 is secured at its upper and lower end portions to flanges 88 and 90, and thus traverses an arcuate path when shaft 32 pivots. Preferably the entire assembly including shaft 32, the arms, frame 84 and voice coil 92, is constructed of aluminum. This reduces the differential thermal expansions of this assembly, enabling more accurate location of the recording heads with respect to the magnetic tracks located on the disks.

Voice coil 92 forms a thin, rectangular frame. The voice coil is generally flat, but more precisely is curved about longitudinal axis 30 The frame is formed of multiple windings (preferably over 100) of a rectangular cross section aluminum wire. The windings themselves form the voice coil frame, there being no core about which the wire is wound, for example, as in the well-known bobbin approach.

The longitudinal dimension and width (i.e. arcuate) dimension of voice coil 92 are preferably an order of magnitude greater than the coil thickness. For further details about the coil, reference is made to the aforementioned U.S. patent application Ser. No. 451,200.

Figure 4:
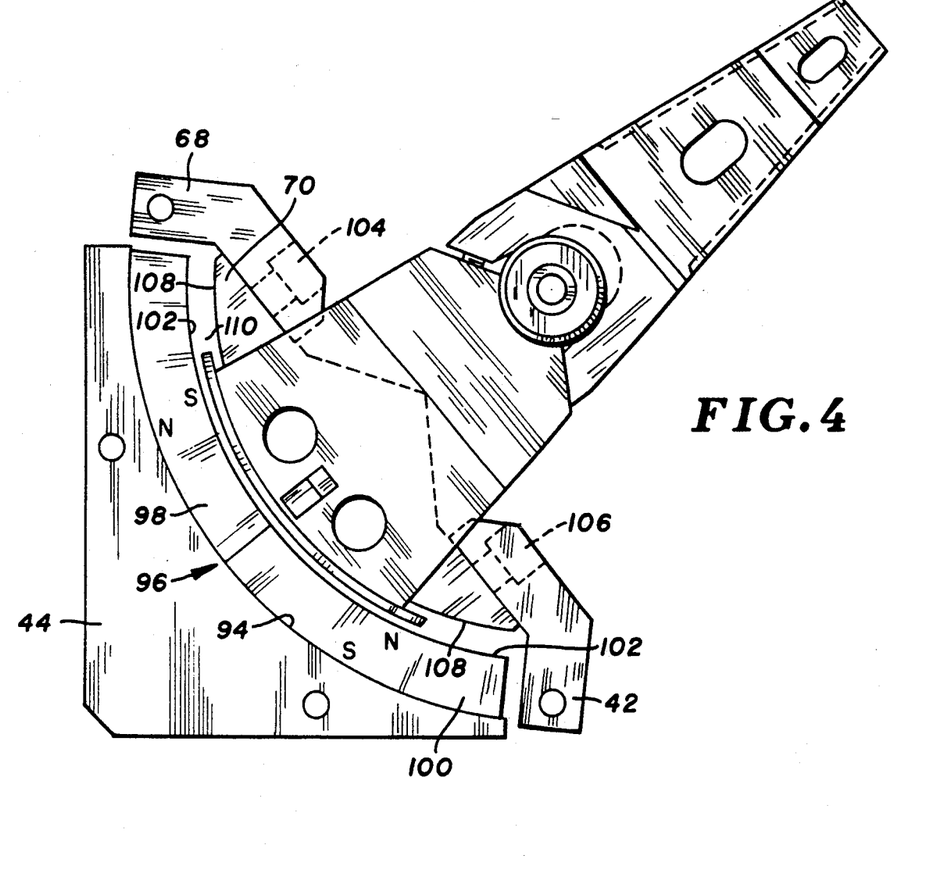
FIG. 4 is a top plan view of the actuator.

As seen in FIG. 4, pole piece 44 includes a radially inward surface 94 curved about axis 30. A permanent magnet assembly 96, including magnets 98 and 100, is secured to pole piece 44. Magnets 98 and 100 are arcuate, curved about the pivot axis and thus conform to surface 94 of pole piece 44. This facilitates a mounting of magnets 98 and 100 to the pole piece, with radially outward faces of the magnets contiguous with surface 94. A radially inward surface 102 of the magnet assembly likewise is curved about the pivot axis.

Radially inward pole piece 70 is fixed with respect to deck 18, situated between and spaced apart from flanges 88 and 90 to permit movement of the head arm assembly. More particularly, fasteners as indicated at 104 and 106 secure pole piece 70 to brackets 42 and 68. A radially outward surface 108 of pole piece 70 is curved about the longitudinal axis, and thus cooperates with surface 102 of magnet assembly 96 to form an arcuate, longitudinal air gap 110 between the magnet and the radially inward pole piece. Coil 92 is situated within air gap 110, preferably radially centered.

Rotary actuator 24 functions in a well-known manner. When electric current is supplied to voice coil 92, a magnetic field is generated about the voice coil that interacts with the magnetic field about permanent magnet assembly 96. The force of the interacting magnetic fields moves voice coil 92 relative to the permanent magnet assembly, thus to pivot shaft 32 and the head arm assembly, which in turn moves magnetic transducing head 36 and the remaining head in arcuate paths. Thus, each of the transducing heads is movable generally radially of its associated one of the magnetic disks, which, in combination with disk rotation, enables the selected head positioning necessary for recording and retrieving data.

Figure 5:
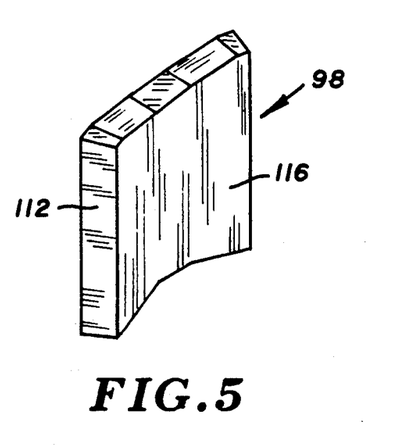
FIG. 5 is a perspective view of a permanent magnet used in the actuator.
Figure 6:
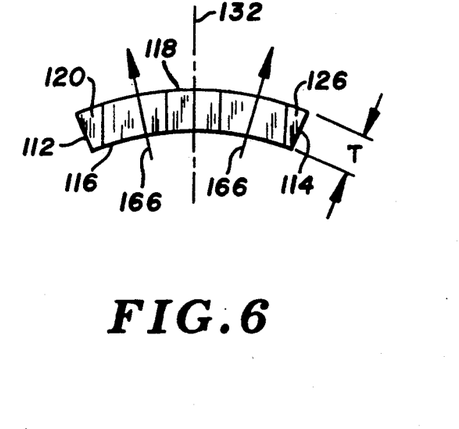
FIG. 6 is a top plan view of the permanent magnet.
Figure 7:
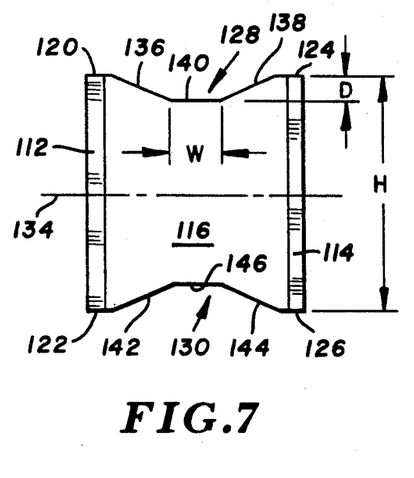
FIG. 7 is a front view of the permanent magnet.

FIGS. 5-7 illustrate permanent magnet 98 removed from actuator 24 to more clearly illustrate its structural features. It is to be understood that magnet 100 is substantially identical in construction, but with the magnetic N and S poles oriented opposite to the orientation for magnet 98, as seen from FIG. 4. In general, magnet 98 has the shape of a segment of a right circular cylinder curved about pivot axis 30, with a height H in the longitudinal direction, an arcuate or circumferential width extended from a side edge 112 of the magnet to an opposite side edge 114, and a thickness T in the radial direction. Radially inward and outward surfaces, shown at 116 and 118 respectively, are curved about the pivot axis. Magnet 98 includes transverse top and bottom surfaces 120 and 122 near side edge 112, and corresponding transverse top and bottom surfaces 124 and 126 near side edge 114.

Upper and lower notches 128 and 130 are formed in the magnet. Notches 128 and 130 extend through the entire thickness of the magnet, are centered between side edges 112 and 114, and are symmetrical about a longitudinal plane 132 that bisects the magnet. The notches when considered together are further symmetrical about a transverse bisecting plane illustrated at 134.

Notch 128 is defined by opposed inclined planar surfaces 136 and 138, each of which is inclined inwardly to a planar, transverse surface 140 longitudinally inwardly of surfaces 120 and 124. Notch 130 likewise is defined by opposed inclined surfaces 142 and 144 and an inward transverse surface 146. The transverse inward surfaces 140 and 146 have the same width, indicated at W in FIG. 7. Notches 128 and 130 have the same depth D. In one example, a magnet with a height H of about 1.5 inches, and an arcuate width of about 1.2 inches, has a notch width W of about 0.3 inches and a notch depth D of about 0.045 inches. It is to be appreciated, however, that these values vary with the size and shape of the voice coil.

Figure 8:
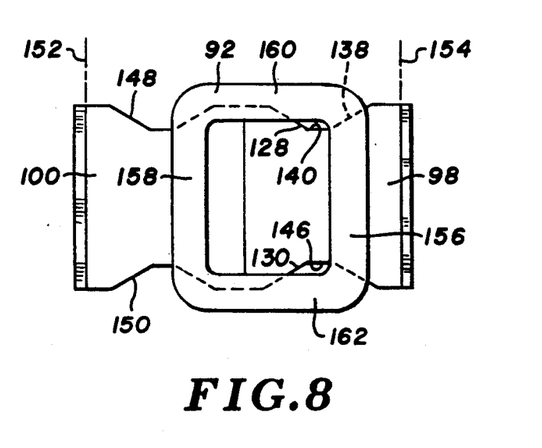
FIG. 8 is a schematic view of a coil of the rotary actuator superimposed upon the magnet.

From FIG. 8 it is seen that magnet 100 is substantially identical in structure to magnet 98, having respective upper and lower notches 148 and 150, with respective inward transverse surfaces both having width W, and its associated inclined planar surfaces. Coil 92 is superimposed upon magnets 98 and 100, in an exemplary position along the arcuate path traversed by the coil as it pivots the head arm assembly when conducting electrical current. Vertical lines at 152 and 154 indicate opposite extremes of the arcuate path traversed by the coil.

While coil 92 is a continuous winding, it is conveniently considered to include a pair of opposed vertical or longitudinal segments 156 and 158, an opposed pair of transverse or horizontal segments 160 and 162 joined to the vertical segments. Vertical segments 156 and 158 are active in the sense that when conducting electrical current, they generate a magnetic field that interacts with the field of permanent magnets 98 and 100 to selectively pivot the head arm assembly. The magnetic fields of horizontal segments 160 and 162 do not contribute to the motive force, but these segments are necessary in completing the electrically conductive path of the coil.

The force for pivoting the head arm assembly is a function of the current through coil 92, the density of the magnetic material forming magnets 98 and 100, and the shape of the magnets. More particularly, magnets 98 and 100 are formed by a forging process which results in radial magnetic flux paths, as indicated by lines 166 in FIG. 6. A further result of the forging process, however, is that in each of magnets 98 and 100, the density of magnetic material is greatest at the center, diminishing gradually toward the peripheral regions of the magnet, to a minimum density along the top, bottom and side edges.

As can be understood from FIG. 8, notches 128, 130, 148 and 150 counteract the effect of the gradient in material density. As shown in FIG. 8, vertical segment 156 of the coil is adjacent inclined surface 138 of magnet 98, just beyond inward surfaces 140 and 146. Vertical segment 158 is similarly aligned with magnet 100.

Assume that head arm assembly 28 is pivoted clockwise as viewed in FIG. 4, moving the coil leftward as viewed in FIG. 8 to align segments 156 and 158 with their respective inward surfaces (or minimum-height segments) of the magnets. Along this central region of each magnet, the material density is at the maximum level. At the same time, however, the height of each magnet is at the minimum value. Thus, as compared to the position illustrated in FIG. 8, the "centered" coil position involves reduced magnet height and increased magnet material density. Conversely, moving coil 92 to the right as viewed in FIG. 8 moves vertical segments 156 and 158 away from the centers of their respective magnets, for increased magnet height and diminishing density of the magnetic material. Thus, coil movement in either direction involves changes in magnetic material density and height of the magnet, whereby the force due to the magnetic fields of the coil and magnets tends to remain constant over the entire arcuate path of coil travel.

Figure 9:
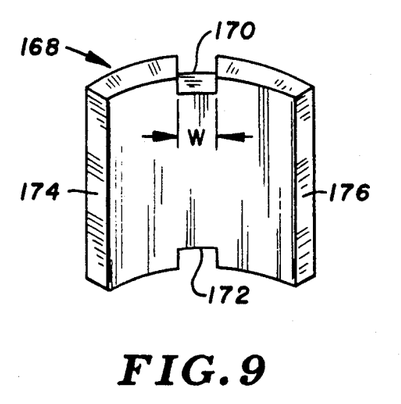
FIGS. 9-13 illustrate alternative embodiment permanent magnets.

FIG. 9 illustrates an alternative magnet 168 having rectangular notches 170 and 172 at the top and bottom respectively. Thus the effective height of magnet 168 is diminished abruptly along a vertical central region, to offset the density gradient effect. Notches 170 and 172 are centered between side edges 174 and 176. The width W of notches 170 and 172 again is preferably less than, or at most equal to, the arcuate span of each vertical segment of coil 92. The structure of magnets 98 and 100 is generally preferred over the structure of magnet 168, due to the more gradual diminishing of magnet height from the side edges to the center.

Figure 10:
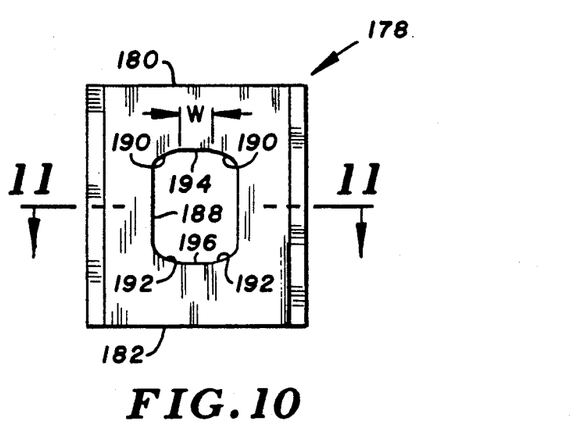
Figure 11:
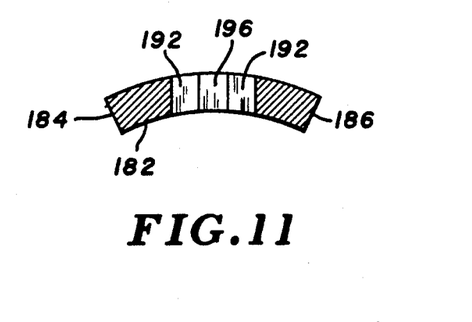

FIGS. 10 and 11 illustrate another alternative magnet 178 having planar and transverse top and bottom surfaces 180 and 182, and longitudinal side edges 184 and 186. In lieu of notches, a central opening 188 is formed through the magnet. Respective intermediate surfaces 190 and 192 of the opening are inclined toward respective transverse surfaces 194 and 196 that are centered between side edges 184 and 186. The width of transverse surfaces 194 and 196 is preferably less than the span of each vertical coil segments 156 and 158.

Figure 12:
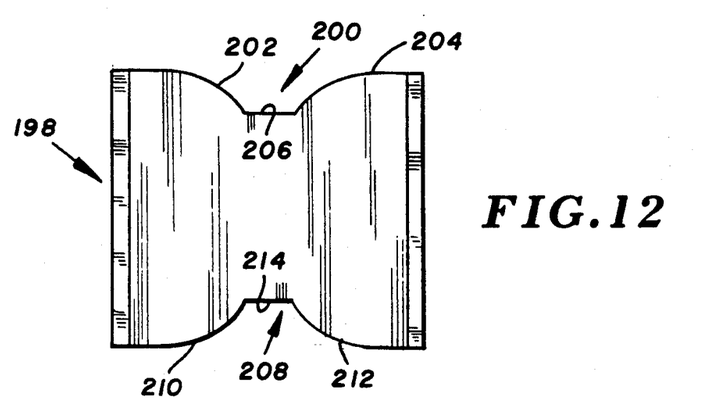

FIG. 12 illustrates yet another alternative magnet 198 having an upper notch 200 defined by opposed curved surfaces 202 and 204 and a transverse inward surface 206, and a lower notch 208 defined by opposed curved surfaces 210 and 212 and an inward transverse surface 214. For each of surfaces 202, 204, 210 and 212, the slope increases in the direction away from the side edges and toward the associated inward transverse surface. Accordingly, notches 200 and 208 more precisely counter-balance the density gradient, for magnets in which the rate of increase in density, as well as density itself, increases in the direction toward the center of the magnet.

Figure 13:
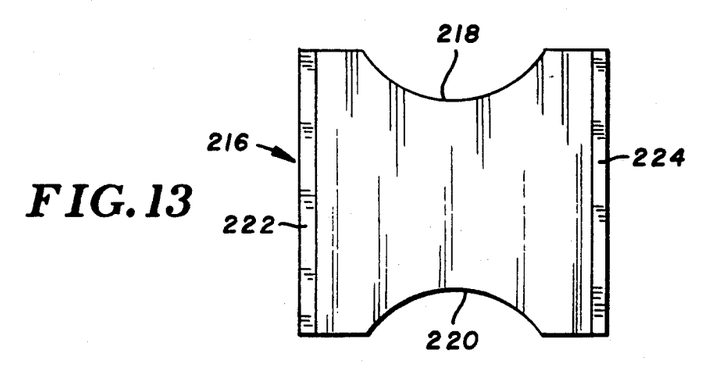

FIG. 13 shows an alternative magnet 216 having an upper notch 218 and a lower notch 220, both with circular profiles. More particularly, upper notch 218 is defined by a concave surface forming an arc about a transverse axis above the magnet and contained in a longitudinal bisecting plane of the magnet, which would appear in the figure as a point above magnet 216. Notch 220 similarly forms an arc about a transverse axis in the bisecting plane below the magnet. Both notches are centered between opposite side edges 222 and 224 of the magnet. The notches in magnet 216 have slopes that decrease in the direction away from edges 222 and 224 and toward the magnet.

In all cases where notches include an inner transverse surface, the width w of the transverse surface is preferably less than, or at most equal to, the span S of each of vertical coil segments 156 and 158. If the inward surfaces were wider than the coil span, there would be no decrease in magnet height to offset the increased material density as the vertical coil segments moved toward the center of the inner surfaces from near their edges. In all cases, the notches (or the opening in connection with FIGS. 10 and 11) extend through the entire thickness of each magnet. This preserves the magnet thickness, and more importantly preserves the ratio of magnet thickness to the radial dimension of the air gap, sometimes known as the load line. This ratio is maintained above two, to insure that the magnets remain magnetized even when subjected to high temperatures.

Finally, the amount the magnet height is diminished (i.e. the vertical distance in each notch between the inner horizontal surface and top or bottom of the magnet), and the slope or curvature of the other notch defining surfaces, may be selected as appropriate to counteract the material density gradient.

Figure 14:
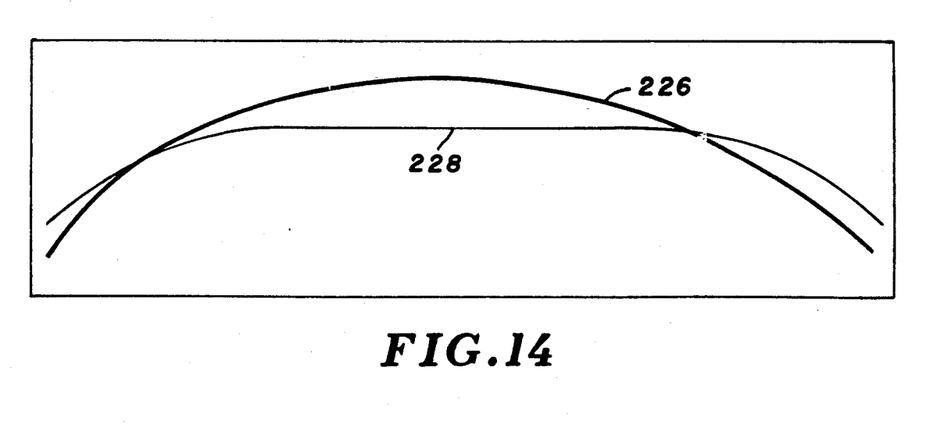
FIG. 14 is a chart illustrating the improvement in the distribution of force along the arcuate width of permanent magnets constructed according to the present invention.

The chart in FIG. 14 plots strength of the magnetic field of an arcuate magnet, without any notches or openings as at 226, and with notches as at 228. Curve 226 is rounded to reflect the material density gradient, which yields a substantial (11-13 percent) drop in magnetic field strength from the center to near the ends of the magnet. By contrast, notches in the magnet tend to flatten the central portion of curve 228, and reduce the differential in magnetic field strength such that the strength diminishes by from five to six percent, rather than by eleven to thirteen percent. The plots in FIG. 13 are based on a magnet having notches similar to notches 170 and 172 in FIG. 9. Accordingly, the inclined planar surfaces forming notches 148 and 150 in magnet 98, and the sloped surfaces forming notches 200 and 208 in magnet 198, show improved consistency in the magnetic field across the arcuate or circumferential width of the magnet.

Thus, in accordance with the present invention, a rotary actuator includes an arcuate permanent magnet formed to provide radial magnetic flux paths, and shaped to counteract a gradient in the density of magnetic material forming the magnet. More particularly, specially shaped notches or openings, through the entire thickness of each magnet, diminish the effective height of the magnet as the material density increases. As a result, the motive force, generated through interaction of the magnetic fields of the permanent magnet and voice coil, remains substantially constant over the entire arcuate path traversed by the coil, for more consistent and precise positioning of magnetic transducing heads in the course of reading and recording data stored on magnetic disks.

What is claimed is:

1. A rotary actuator for variably and controllably positioning a magnetic transducing head relative to a magnetic disk mounted for rotation on a stationary disk drive frame; said actuator including:

a head arm assembly having at least one transducer support arm and a magnetic transducing head mounted to the support arm, said assembly being supported on a disk drive frame for pivoting relative to the frame about a longitudinal pivot axis to carry the transducing head in an arcuate path relative to a data recording surface of the disk;

an electrically conductive voice coil curved about the pivot axis and fixed to the head arm assembly for arcuate travel as the assembly pivots, said coil including at least one elongate, longitudinally extended voice coil active region for pivoting the head arm assembly when conducting an electrical current; and a permanent magnet fixed with respect to the disk drive frame and having mutually perpendicular dimensions including a height in the longitudinal direction, a circumferential arcuate width about the pivot axis from a first side edge to a second side edge of the magnet, and a thickness radially of the pivot axis, said magnet being radially spaced apart form the voice coil for allowing arcuate travel of the voice coil active region from proximate the first side edge to proximate the second side edge to pivotally reciprocate the head arm assembly;

wherein the magnet includes a non-magnetic region spanning the entire thickness, substantially centered between the first side edge and the second side edge, and symmetrical about a longitudinal plane that bisects the magnet, so as to maintain a substantially constant, acceptably high load line.

2. The rotary actuator of claim 1 wherein said non-magnetic region further is symmetrical about a plane bisecting the magnet and perpendicular to said height of the magnet.

3. The rotary actuator of claim 2 wherein the non-magnetic region includes two opposed, substantially equally sized notches extended longitudinally inwardly of the magnet from opposite top and bottom edges of the magnet.

4. The apparatus of claim 3 wherein the magnet is magnetized to provide radial flux paths.

5. The rotary actuator of claim 4 wherein the voice coil active region of the voice coil has an arcuate coil width substantially less than the arcuate width of said magnet, and each of the notches has an arcuate width less than the difference between the arcuate magnet width and twice the coil width.

6. The rotary actuator of claim 5 wherein all surfaces of the magnet defining the notches are parallel to a line perpendicular to said height of the magnet and contained within said longitudinal plane.

7. The rotary actuator of claim 3 wherein the non-magnetic region includes a substantially rectangular opening through the magnet, the opening being centered between the first and second side edges and further centered between the top and bottom edges of the magnet.

8. The rotary actuator of claim 3 wherein each of the notches is defined by a centered transverse surface, and two opposed intermediate surfaces, each inclined inwardly from one of two opposed end surfaces of the magnet, to the transverse surface, each of said transverse surfaces having a width less than the coil width.

9. The rotary actuator of claim 8 wherein each pair of opposed intermediate surfaces is planar.

10. The rotary actuator of claim 8 wherein each of the opposed intermediate surfaces has a slope that increases as it approaches the transverse surface.

11. The rotary actuator of claim 8 wherein each of the notches is defined by a concave surface, curved about a transverse axis remote from the magnet and contained within the longitudinal bisecting plane.

* * * * *